(12) United States Patent
Nisbet (10) Patent No.: US 7,562,792 B2
(45) Date of Patent: Jul. 21, 2009

(54) METHOD AND APPARATUS FOR METERING A FLUID MIXTURE

(76) Inventor: George Nisbet, 7 Al Lin, Bridgeton, MO (US) 63044

( * ) Notice: Subject to any disclaimer, the term of this patent is extended or adjusted under 35 U.S.C. 154(b) by 725 days.

(21) Appl. No.: 11/151,361

(22) Filed: Jun. 13, 2005

(65) Prior Publication Data
US 2006/0278658 A1 Dec. 14, 2006

(51) Int. Cl.
*B67D 5/52* (2006.01)
(52) U.S. Cl. .................. 222/137; 222/1; 222/145.6; 222/134; 222/135; 222/309
(58) Field of Classification Search ............ 222/145.6, 222/1, 145.5, 71, 129, 137, 134–135, 282, 222/309, 335; 137/571, 576
See application file for complete search history.

(56) References Cited

U.S. PATENT DOCUMENTS

| | | | |
|---|---|---|---|
| 2,810,495 A * | 10/1957 | Carriol et al. ............... 222/1 |
| 3,642,175 A * | 2/1972 | Robbins .................. 222/135 |
| 3,948,105 A | 4/1976 | Johnson, Jr. |
| 3,979,034 A | 9/1976 | Larman |
| 4,069,835 A | 1/1978 | Stadler |
| 4,079,629 A | 3/1978 | Hope |
| 4,140,160 A | 2/1979 | Glackin |
| 4,169,544 A | 10/1979 | Blanchet |
| 4,262,710 A * | 4/1981 | Nomura et al. ............... 141/98 |
| 4,286,632 A | 9/1981 | Abel |
| 4,416,396 A | 11/1983 | Ward |
| 4,445,370 A | 5/1984 | Whitmire |
| 4,447,245 A | 5/1984 | Smith et al. |
| 4,673,296 A * | 6/1987 | Sjogren .................. 366/159.1 |
| 4,726,330 A | 2/1988 | Shiga |
| 4,779,993 A | 10/1988 | Toole |
| 4,819,833 A | 4/1989 | Huddleston et al. |
| 5,108,016 A | 4/1992 | Waring |
| 2002/0179477 A1 | 12/2002 | Champoux |

* cited by examiner

*Primary Examiner*—Frederick C. Nicolas
(74) *Attorney, Agent, or Firm*—Polster, Lieder, Woodruff & Lucchesi, LC (57) ABSTRACT

The invention is a fluid metering pump having a fuel cylinder with a fuel piston reciprocally movable within the fuel cylinder for drawing fuel from a fuel source and discharging the fuel through a discharge conduit. The pump also has an oil cylinder with an oil piston reciprocally movable within the oil cylinder for drawing oil from an oil reservoir and discharging the oil through a discharge conduit, wherein the oil mixes with the fuel within the discharge conduit to form a batch of fuel-oil mixture with a predetermined fuel-to-oil ratio. A ratio adjustment component allows the operator to select the fuel-to-oil ratio of each batch of fuel-oil mixture.

19 Claims, 8 Drawing Sheets

METHOD AND APPARATUS FOR METERING A FLUID MIXTURE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to a method and apparatus for metering a fluid mixture. Two-stroke gasoline engines require that oil be mixed with the gasoline fuel in a prescribed ratio in order to adequately lubricate the engine parts. Common ratios of fuel-to-oil are 16:1 and 32:1. Typically, these types of engines are small and are attached to a device such as a weed-eater, a chain saw, a snow blower and the like. Frequently, yard workers use a multiplicity of these devices and are required to refill the fuel tanks with an oil-gasoline mixture of prescribed ratio of fuel-to-oil, the ratios differing from device to device. This requires carrying a multiplicity of "gas cans" having a variety of fuel-to-oil mixtures in order to refill the fuel tank of each device with an appropriate fuel-to-oil ratio mixture.

The present invention provides a single apparatus having a fuel reservoir, an oil reservoir and the capability of selecting a given fuel-to-oil ratio, and preparing and discharging a prescribed fuel/oil mixture in batch form.

SUMMARY OF THE INVENTION

The present invention provides a method and apparatus for metering a fluid mixture. The apparatus is provided with a fuel piston reciprocally movable within a fuel cylinder for drawing fuel from a fuel source and discharging the fuel through a discharge conduit. The apparatus further has an oil cylinder and an oil piston reciprocally movable within the oil cylinder for drawing oil from an oil reservoir and discharging the oil through a discharge conduit. The oil mixes with the fuel within the discharge conduit to form a batch of fuel and oil mixture with a predetermined fuel-to-oil ratio. The apparatus also has a ratio adjustment component, which is operatively connected between the fuel piston and the oil piston, wherein the ratio adjustment component is capable of selecting the fuel-to-oil ratio of each batch of fuel/oil mixture.

The present invention provides a method for preparing a fuel/oil mixture of predetermined ratio by operatively selecting a predetermined ratio of fuel-to-oil by setting a ratio adjustment component to the desired selection. A fuel piston handle is manually raised causing fuel to fill the fuel cylinder and oil to fill the oil cylinder simultaneously to the preset levels. A shuttle valve lever is manually operated opening both an oil shuttle valve and a fuel shuttle valve simultaneously to empty the fuel and oil cylinders into a discharge conduit wherein the oil/fuel mixture is mixed in a static mixer in the discharge conduit prior to discharge.

BRIEF DESCRIPTION OF THE DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

As shown in FIGS. 1-9, a preferred embodiment of the present invention, generally referred to as a fluid-metering pump 10, includes a housing 12 having an oil reservoir 14 for storing oil and being mounted on top of a fuel reservoir 16 for storing fuel. The housing 12 also includes a fuel cylinder 18 and an oil cylinder 20, which operatively engage with a corresponding fuel piston 22 and an oil piston 24. Generally, the pistons 22 and 24 move reciprocally within the cylinders 18 and 20 to draw fuel from the fuel reservoir 16 and oil from the oil reservoir 14, and mix and discharge a batch of fuel-oil mixture through a spout 26. A ratio adjustment device 28 mounted within the housing 12 operatively connects the fuel piston 22 with the oil piston 24 so that an operator can select a fuel-to-oil ratio for each batch of a fuel/oil mixture discharged from the pump 10.

Figure 1:
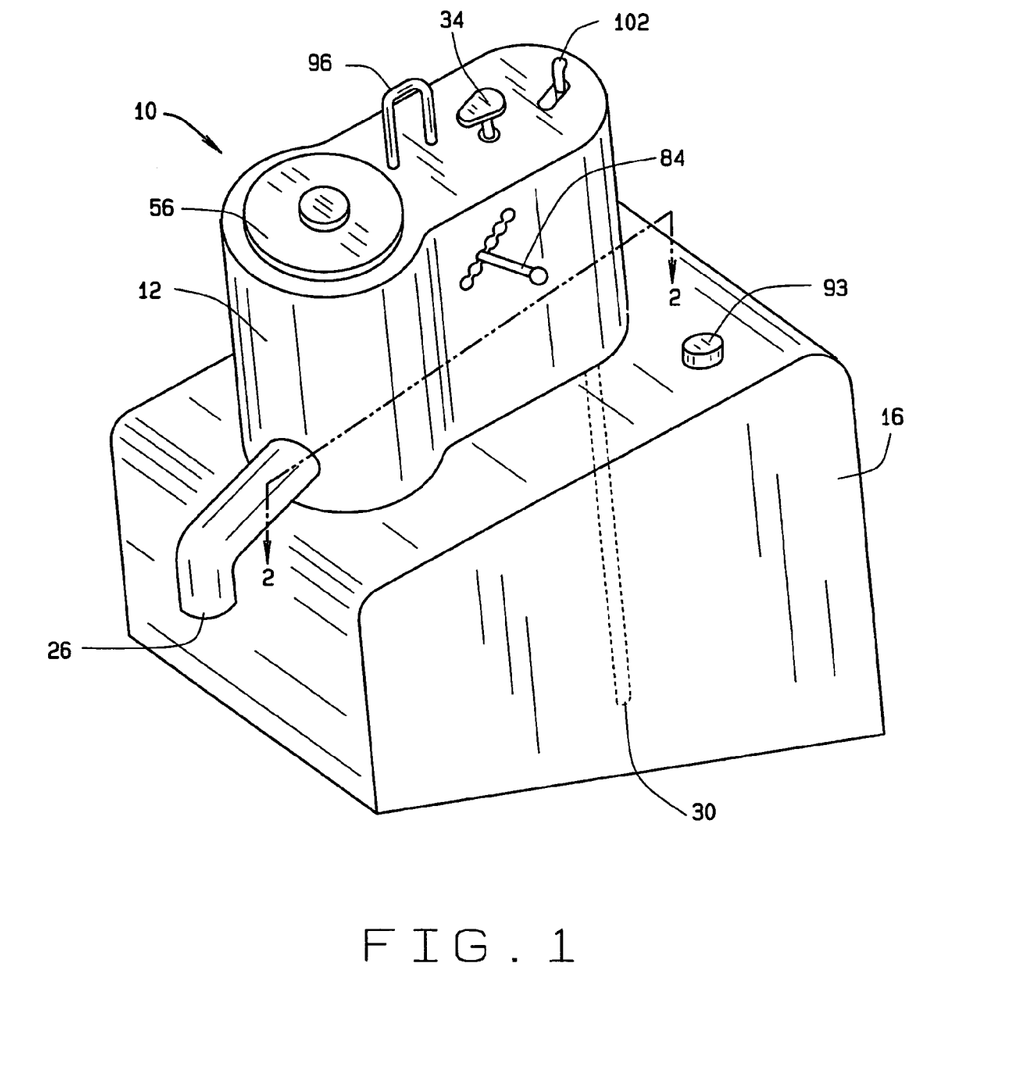
FIG. 1 is a perspective view of a fluid metering apparatus.
Figure 2:
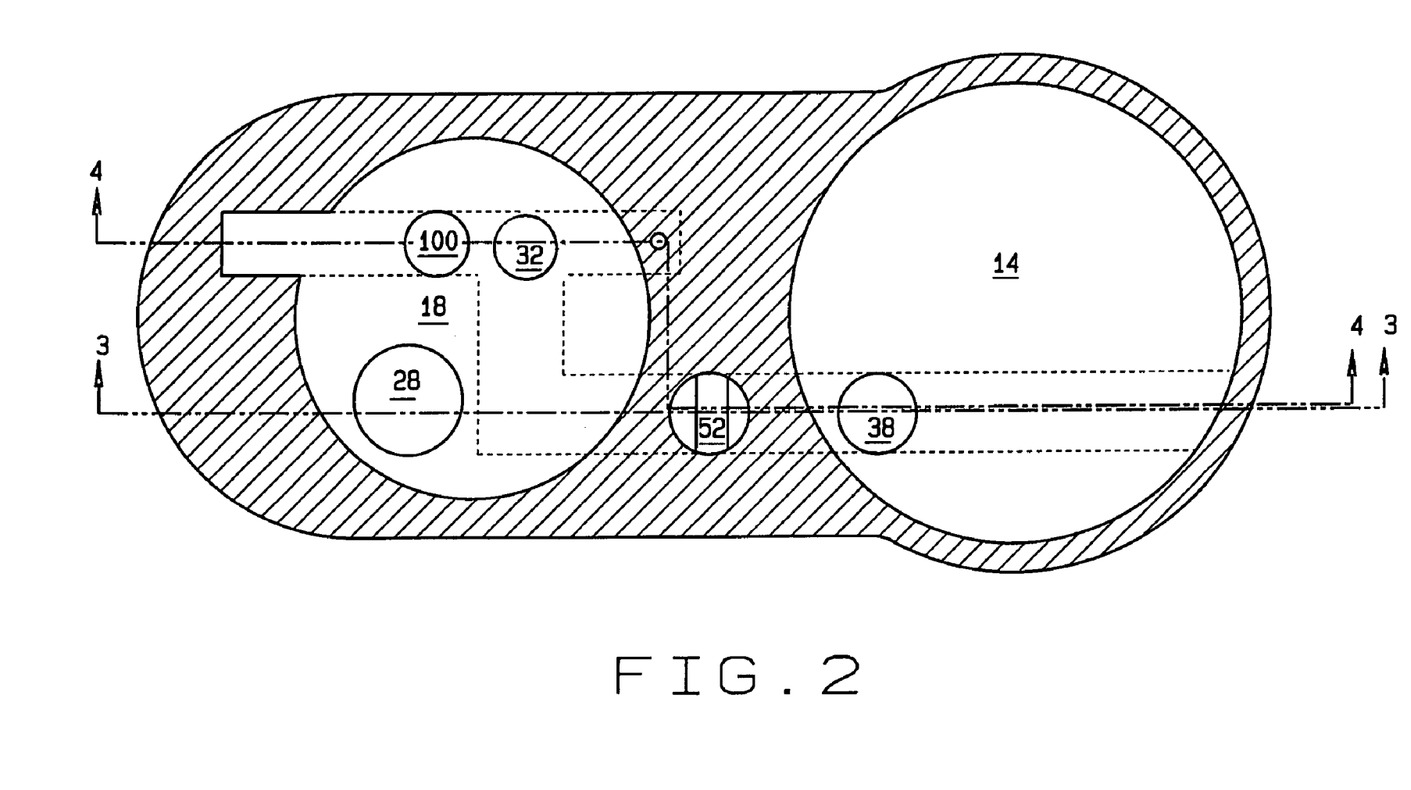
FIG. 2 is a sectional view of the fluid metering apparatus along line 2-2 of FIG. 1.
Figure 3:
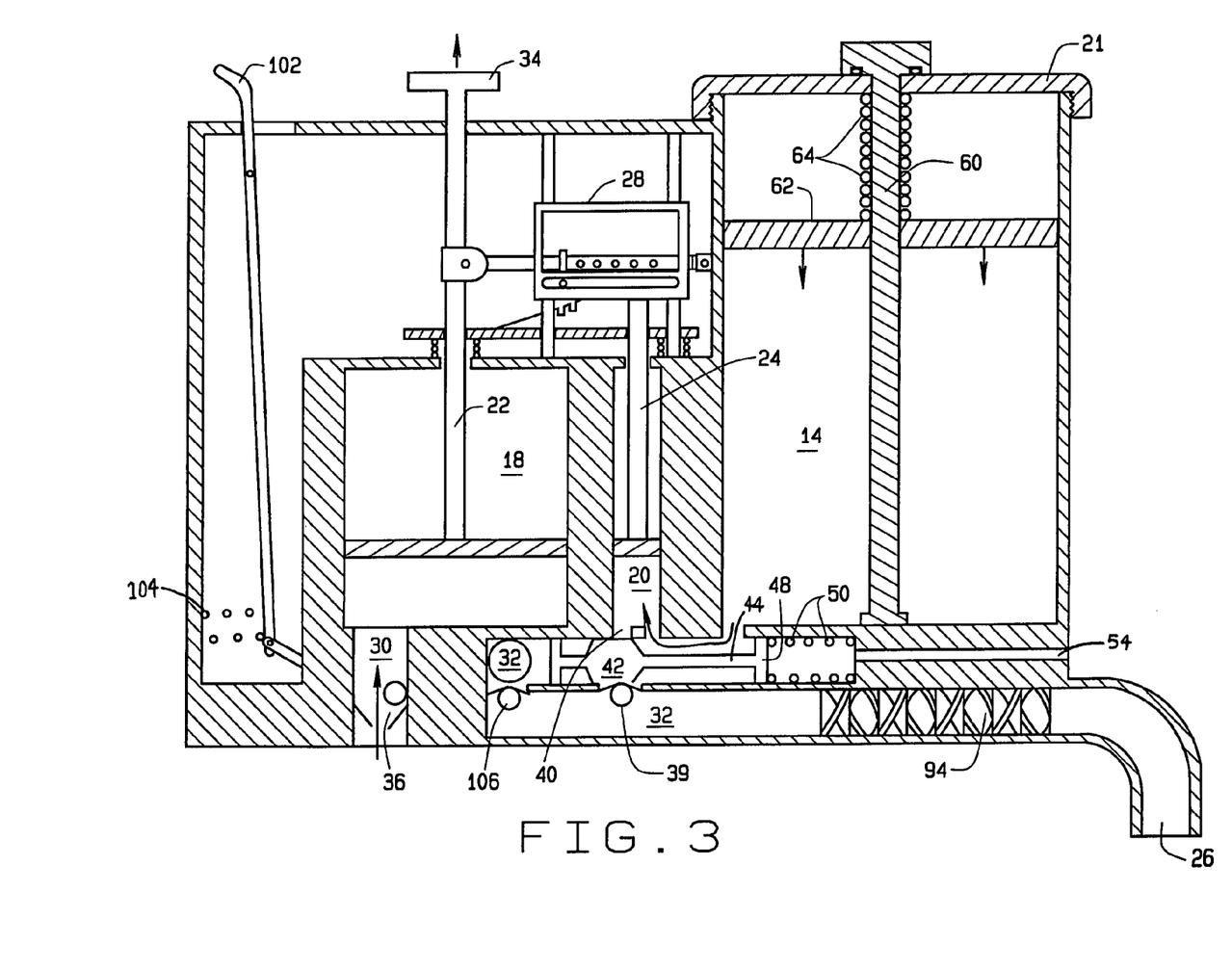
FIG. 3 is a sectional view of the fluid metering apparatus along line 3-3 of FIG. 2 during an intake stroke.

Specifically as shown in FIGS. 1-3, the fuel cylinder 18 communicates with the fuel reservoir 16 via a fuel conduit 30 and communicates with the spout 26 via a discharge conduit 32. To operate the pump 10, the operator engages a handle 34 of the fuel piston 22 to raise and lower the fuel piston 22 within the fuel cylinder 18. As the operator raises the fuel piston 22 (FIG. 3), hereby referred to as the intake stroke, fuel is drawn up through the fuel conduit 30 and into the cylinder 18. As the operator lowers the fuel piston 22 (FIGS. 4 and 5), hereby referred to as the discharge stroke, fuel is forced into the discharge conduit 32. A check valve 106 located within the discharge conduit 32 prevents any fuel from returning to the fuel cylinder 18. Another check valve 36 located within the fuel conduit 30 prevents any fuel from returning to the fuel reservoir 16 during the discharge stroke.

As shown in FIGS. 2-5, the oil piston 24 communicates with the oil reservoir 14 via an oil conduit 38 and communicates with the spout 26 via the oil conduit 38, check valve 39, and discharge conduit 32, respectively. As mentioned above, the oil piston 24 operatively connects to the fuel piston 22 with the ratio adjustment device 28. As a result, the oil piston 24 operates in tandem with the fuel piston 22. In other words, as the operator raises and lowers the fuel piston 22, the oil piston 24 raises and lowers correspondingly. As the oil piston 24 rises during the intake stroke (FIG. 3), oil is drawn from the oil reservoir 14 through the oil conduit 38 and into the oil cylinder 20. As the oil piston 24 lowers during the discharge stroke (FIG. 5), oil is forced back through the oil conduit 38 and, due to an oil shuttle valve 40, through the check valve 39 and into the discharge conduit 32. The check valve 39 prevents any oil or fuel from entering the oil conduit 38 from the discharge conduit 32, which would otherwise contaminate the oil reservoir 14.

Figure 5:
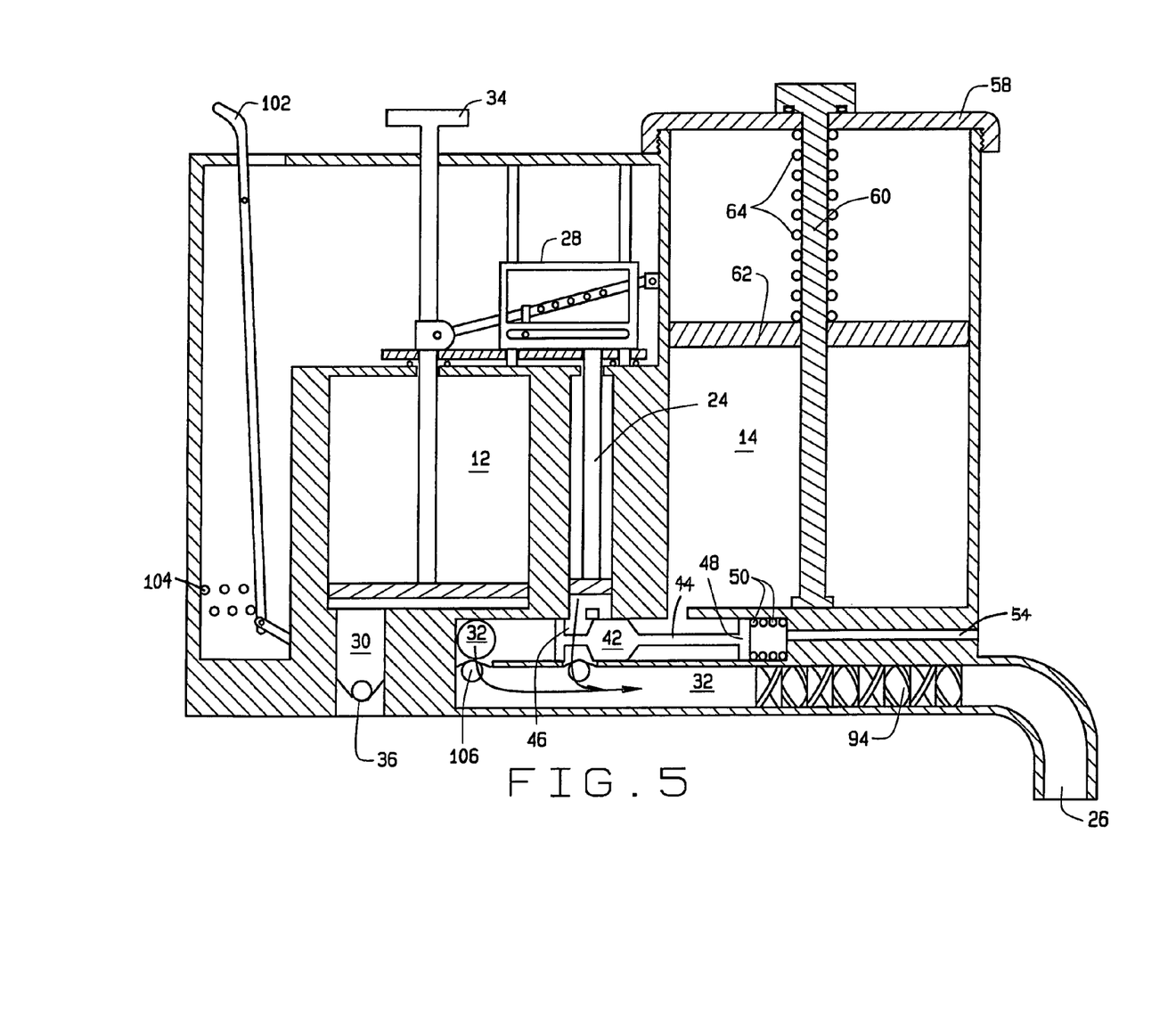
FIG. 5 is a sectional view of the fluid metering apparatus along line 3-3 of FIG. 2 during a discharge stroke.

As seen in FIGS. 3 and 5, the direction of oil flow within the oil conduit 38 varies according to the position of the oil shuttle valve 40. The oil shuttle valve 40 is barbell-shaped with a center element 42 connected with links 44 between a front element 46 and rear element 48. The oil shuttle valve 40 shifts within the oil conduit 38 between an intake position and a discharge position. In the intake position (FIG. 3), the oil shuttle valve 40 is positioned with the center element 42 obstructing the check valve 39 so that oil can only flow between the oil reservoir 14 and the oil cylinder 20 during the intake stroke. A spring 50 located within the oil conduit 38 biases the oil shuttle valve 40 to the intake position as the default position. In the discharge position (FIG. 5), the oil shuttle valve 40 is positioned with the spring 50 compressed and with the center element 42 obstructing the path between the oil reservoir 14 and the oil cylinder 20. Instead, the gap between the center element 42 and the front element 46 creates a path for the oil to flow from the oil cylinder 20 to the check valve 39. During the discharge stroke, the flow of the fuel through the discharge conduit 32 creates high pressure against the front element 46 of the fuel shuttle valve 40, which overcomes the bias of the spring 50 and shifts the fuel shuttle valve 40 to the discharge position.

In the preferred embodiment of FIGS. 1-9, a divider 52 is positioned at the bottom center of the oil cylinder 20, which allows the oil shuttle valve 40 to move between the intake position and discharge position with a shorter stroke. However, embodiments without a divider 52 can also be used. Also, an equalization conduit 54 connects the rear portion of the oil conduit 38 to the atmosphere. The equalization conduit 54 equalizes the pressure in the oil conduit 38 behind the rear element 48 of the oil shuttle valve 40 so that the valve 40 can shift freely. Without the equalization conduit 54, a vacuum is created behind the rear element 48 that would prevent the valve 40 from shifting.

The oil reservoir 14 includes a removable piston assembly 56 that keeps positive pressure on the oil stored in the reservoir 14. The piston assembly 56 includes a removable threaded cap 58 with a piston rod 60 extending from the center of the cap 58 and a piston 62 that slides along the piston rod 60. A spring 64 biases the piston 62 downward so that the piston 62 maintains positive pressure on the oil within the oil reservoir 14. As the oil level in the reservoir 14 lowers, the spring 64 forces the piston 62 to follow the lowering oil level all the way to the bottom of the reservoir 14. When the oil reservoir 14 is empty, the piston 62 obstructs the oil conduit 38 to create a vacuum that prevents the operator from raising the handle 34. This prevents the operator from accidentally discharging only fuel when the reservoir 14 is empty, and further acts as a signal to the operator to refill the oil reservoir 14. To refill the oil reservoir 14, the operator simply unscrews the cap 58 and removes the piston assembly 56.

Figure 7:
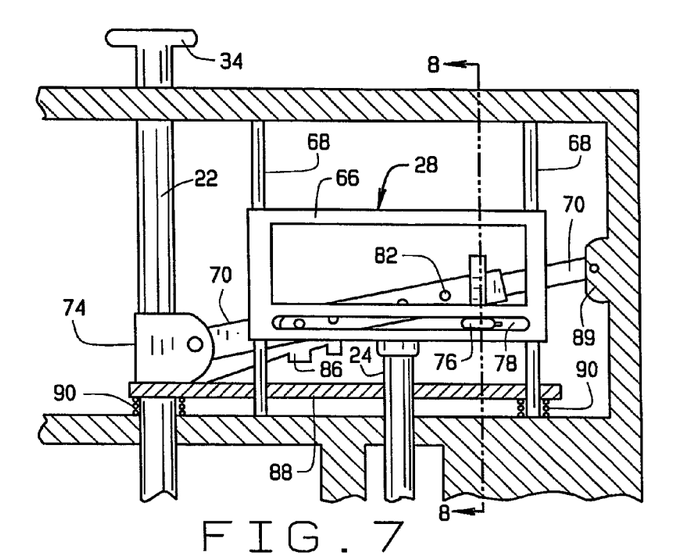
FIG. 7 is an enlarged sectional front elevational view within the square 7-7 of FIG. 4.
Figure 8:
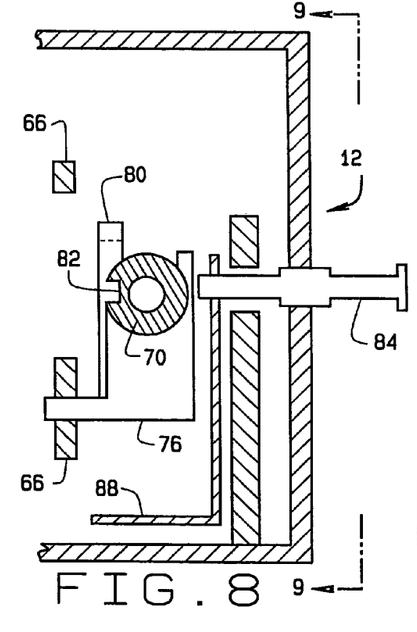
FIG. 8 is a side elevational view along line 8-8 of FIG. 7.

FIGS. 7 and 8 show a preferred embodiment of the ratio adjustment device 28, which operatively connects the fuel piston 22 with the oil piston 24 and determines the fuel-to-oil ratio. The ratio adjustment device 28 comprises a rack 66 that moves vertically along two guide bars 68 and a variable length rod 70 being pivotally fixed between an inner surface 72 of the housing 12 and the fuel piston 22 using a collar 74. The variable length rod 70 includes a first segment that slidably fits within a bore of a second segment so that the rod 70 automatically adjusts in length as the operator raises and lowers the fuel piston 22. The oil piston 24 attaches to the bottom of the rack 66 so that the piston raises and lowers with the rack 66.

An adjustable cradle 76 couples the variable length rod 70 with the rack 66. A leaf spring 80 attached to the cradle 76 secures the cradle 76 in a horizontal position by engaging one of a plurality of detents 82 along the variable length rod 70. The position of the cradle 76 determines the fuel-to-oil ratio. Therefore, each detent 82 designates a specific fuel-to-oil ratio. The preferred embodiment can be set to the most commonly used fuel-to-oil ratios, which include 50:1, 40:1, 32:1, 24:1, and 16:1. However, those skilled in the art will recognize that any fuel-to-oil ratio can be used.

Figure 10:
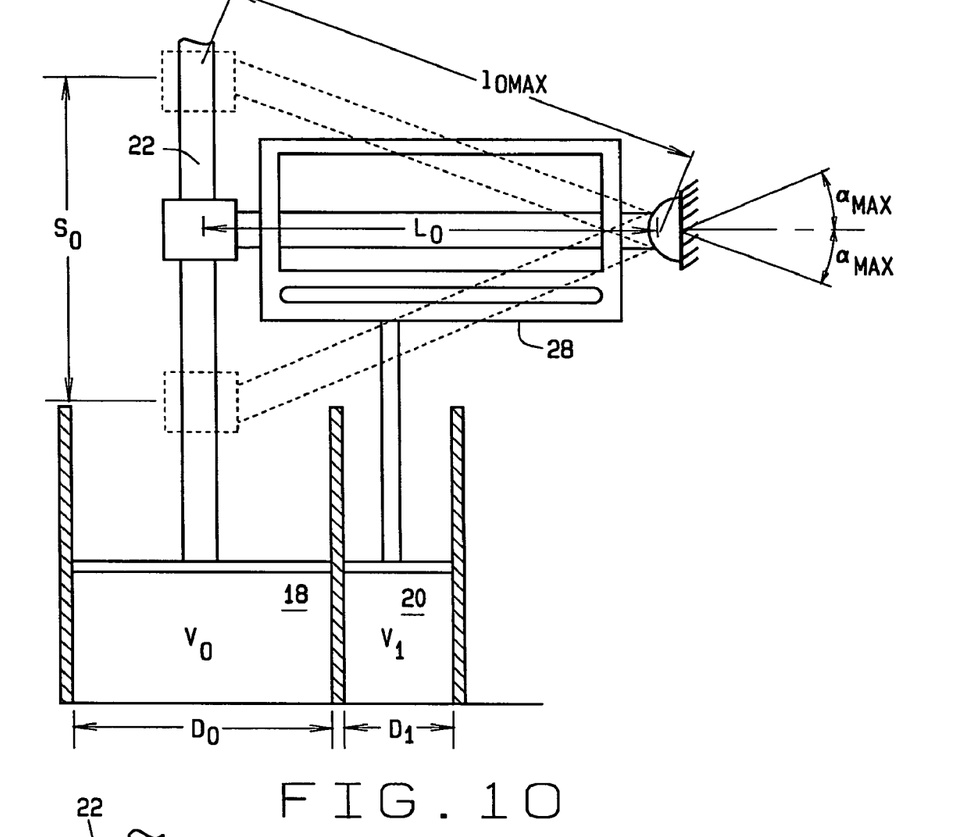
FIG. 10 is an illustration of a mathematical model.
Figure 11:
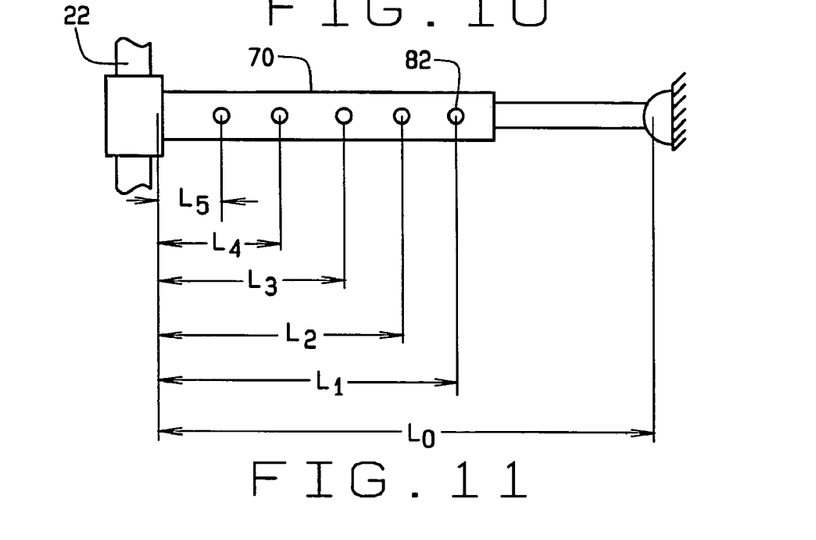
FIG. 11 is a further illustration of a mathematical model.

To discharge a batch of fuel/oil mixture with the correct fuel-to-oil ratios, the metering pump 10 must have an appropriately sized fuel cylinder 18 relative to the oil cylinder 20, and appropriately spaced detents 82. For the above-mentioned fuel-to-oil ratios, the spacing of the detents 82 can be determined using the following mathematical model. Refer to FIGS. 10 and 11 as a visual aid to help understand this model.

Given:

$D_0$=Diameter of Fuel Cylinder $L_0$=Minimum length of Variable Length Rod $L_1$=Position of Detent for fuel-to-oil ratio of 16:1

$S_0$=Maximum Stroke of Fuel Piston $$V_1 = \frac{V_0}{16}$$

$$V_2 = \frac{V_0}{24}$$

$$V_3 = \frac{V_0}{32}$$

$$V_4 = \frac{V_0}{40}$$

$$V_5 = \frac{V_0}{50}$$

Find the Maximum Volume of Fuel ($V_0$), the Maximum Length of the Variable Length Rod ($l_{0max}$), and the Maximum Angle of the Variable Length Rod ($\alpha_{max}$) using equations (1), (2), and (3) shown below.

$$V_0 = \left(\frac{D_0}{2}\right)^2 \cdot S_0 \tag{1}$$

$$l_{0max} = \sqrt{\left(\frac{S_0}{2}\right)^2 + L_0^2} \tag{2}$$

$$\alpha_{max} = \cos^{-1}\frac{L_0}{l_{0max}} \tag{3}$$

For a fuel-to-oil ratio of 16:1, find the Stroke of the Fuel Piston ($S_1$), the Volume of the Oil ($V_1$), and the Diameter of the Oil Cylinder ($D_1$) using equations (4), (5), and (6), shown below.

$$S_1 = 2 \cdot l_1 \cdot \sin \alpha_{max} \quad (4)$$

where $$l_1 = \frac{L_1}{\cos \alpha_{max}} \quad (5)$$

$$V_1 = \frac{V_0}{16} \quad (5)$$

$$D_1 = 2 \cdot \sqrt{\frac{V_1}{\pi \cdot S_1}} \quad (6)$$

For a fuel-to-oil ratio of 24:1, find the Position of Detent ($L_2$) using equations (7), (8), (9) and (10) shown below.

$$V_2 = \frac{V_0}{24} \quad (7)$$

$$S_2 = \frac{V_2}{\pi \cdot \left(\frac{D_1}{2}\right)^2} \quad (8)$$

$$l_2 = \frac{S_2}{2 \cdot l_1 \cdot \sin \alpha_{max}} \quad (9)$$

$$L_2 = l_2 \cdot \cos \alpha_{max} \quad (10)$$

Similarly, find the Position of Detents ($L_3$), ($L_4$), ($L_5$) for the remaining fuel-to-oil ratios.

Figure 9:
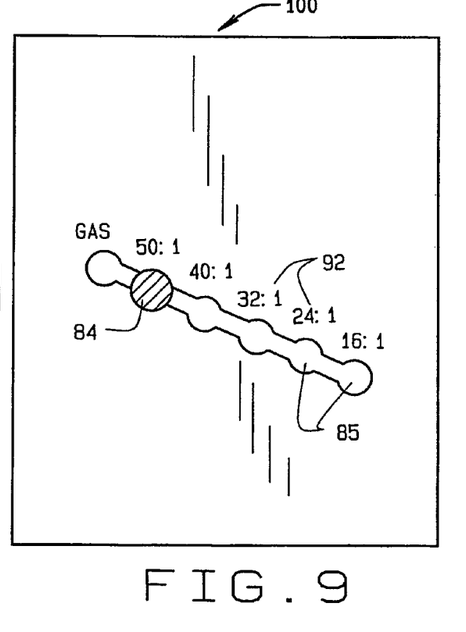
FIG. 9 is a side elevational view along line 9-9 of FIG. 8.

The operator adjusts the position of the cradle 76 by using the adjustment pin 84, which extends through a slot 85 in the outer surface of the housing 12. Indicia 92 positioned around the slot 85 indicates the selected fuel-to-oil ratio. As shown in FIGS. 7-9, during normal operation the adjustment pin 84 is held in place by notches 86 in an interlock plate 88 to indicate what fuel-to-oil ratio is selected. When the operator lowers the fuel piston 22, the collar 74 presses the interlock plate 88 downward, thereby unlocking the adjustment pin 84. The operator presses the adjustment pin 84 into the leaf spring 80 to disengage the cradle 76 from the detent 82. Then, the operator slides the adjustment pin 84 and cradle 76 to the desired detent 82 corresponding to the desired fuel-to-oil ratio. The operator releases the pin 84 and bias springs 90 push the interlock plate 88 upwards, thereby, locking the adjustment pin 84 in the notches 86.

To operate the fuel metering pump 10, the operator first fills the fuel reservoir 16 with fuel via inlet 93 and the oil reservoir 14 with oil by removing the oil piston assembly 56. Next, the operator engages the adjustment pin 84 as described above to select the desired fuel-to-oil ratio. As shown in FIG. 3, the operator raises the fuel piston 22 with an intake stroke, which draws fuel and oil into respective cylinders 18 and 20. As shown in FIG. 5, the operator lowers the fuel piston 22 with a discharge stroke, which communicates fuel and oil from the cylinders 18 and 20 to the discharge conduit 32. A static mixer 94 fixed within the discharge conduit 32 mixes the fuel and oil into a fuel/oil mixture before it discharges through the spout 26. Each cycle of intake stroke and discharge stroke by the operator discharges an independent batch of fuel/oil mixture at a selected fuel-to-oil ratio. This allows the operator to select a different fuel-to-oil ratio for each independent batch of fuel/oil mixture.

The fluid metering pump 10 of the present invention can also be used in a fuel-only setting. This mode requires the rack 66 to remain in a fixed downward position. This is accomplished by completely disengaging the cradle 76 from the variable length rod 70 and engaging the adjustment pin 84 with a detent of the guide bars 68.

Figure 4:
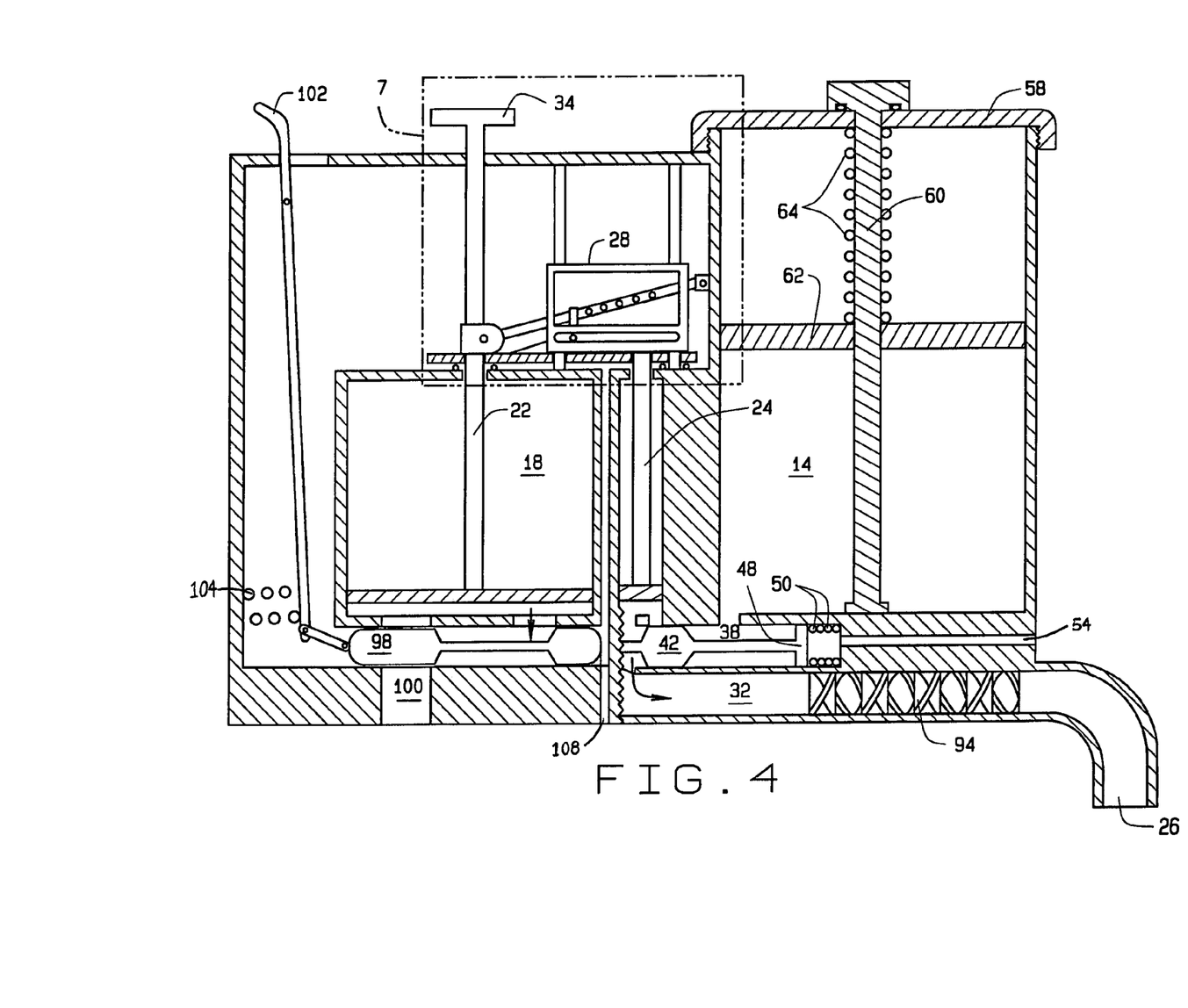
FIG. 4 is a sectional view of the fluid metering apparatus along line 4-4 of FIG. 2 during a discharge stroke.
Figure 6:
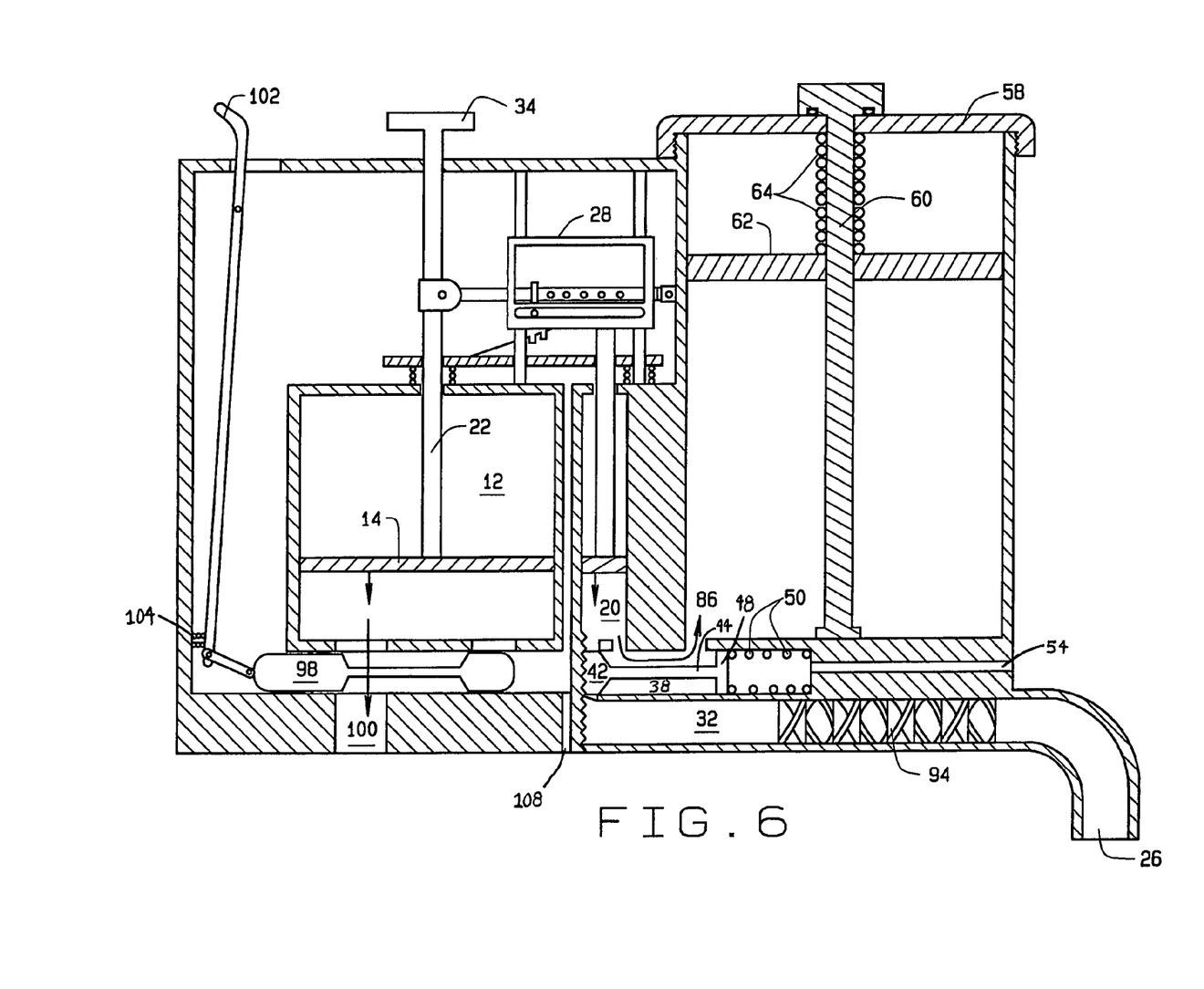
FIG. 6 is a sectional view of the fluid metering apparatus along line 4-4 of FIG. 2 during a fuel dump stroke.

As shown in FIGS. 4 and 6, an operator can return unmixed fuel and oil in the cylinders 18 and 20 back into their respective reservoirs 14 and 16 by engaging a dump shuttle valve 98. The dump shuttle valve 98 shifts within a dump conduit 100 between an operating position (FIG. 4) and a dump position (FIG. 6). In the operating position, the dump shuttle valve 98 obstructs the dump conduit 100 so that fuel can only flow to the discharge conduit 32. In the dump position, the dump shuttle valve 98 obstructs the discharge conduit 32 and opens up the dump conduit 100 so that fuel returns to the fuel reservoir 16. Simultaneously, the oil returns to the oil reservoir 14. To shift the dump shuttle valve 98 between the operating position and dump position, the operator engages a lever 102 attached to the valve 98. A spring 104 connected between the lever 102 and the housing 12 biases the dump shuttle valve 98 to the operating position as the default position. A equalization conduit 108 connects the dump conduit 100 with the fuel reservoir 16. The equalization conduit 108 equalizes the pressure in the dump conduit 100 so that the dump shuttle valve 98 can shift freely.

Although the drawings do not indicate any particular scale, the fluid metering pump 10 can be of small enough size that it is portable and be carried via a handle 96. However, those skilled in the art will recognize that any size pump 10 can be used.

Other embodiments of the invention can use other types of ratio adjustment devices 28, such as a servo motor, a variable ratio geared transmission, or a bell crank assembly. In addition, other embodiments can eliminate the ratio adjustment device 28 altogether so that the fluid metering pump 10 has a single fixed fuel-oil ratio.

What is claimed is:

1. A fluid metering pump, comprising:
a fuel cylinder;
a fuel piston reciprocally movable within the fuel cylinder for drawing fuel from a fuel reservoir and discharging the fuel through a discharge conduit;
an oil cylinder;
an oil piston reciprocally movable within the oil cylinder for drawing oil from an oil reservoir and discharging the oil through a discharge conduit, wherein the oil mixes with the fuel within the discharge conduit to form a batch of fuel-oil mixture with a predetermined fuel-to-oil ratio;
an oil shuttle valve in fluid communication with the oil reservoir, the oil cylinder, and the discharge conduit, wherein the oil shuttle valve moves between an intake position, which communicates the oil from the oil reservoir to the oil cylinder, and a discharge position, which communicates the oil from the oil cylinder to the discharge conduit;
a biasing spring operatively connected to the oil shuttle valve for biasing the oil shuttle valve to the intake position; and
a ratio adjustment device operatively connected between the fuel piston and the oil piston, wherein the ratio adjustment device is capable of setting the fuel-to-oil ratio of each batch of the fuel-oil mixture.

2. The fluid metering pump of claim 1 wherein an amount of the fuel-oil mixture in a batch is selected by selecting a length of stroke of the fuel piston; and
wherein the ratio adjustment device determines the fuel-to-oil ratio by setting the length of stroke of the oil piston to a corresponding length of stroke of the fuel piston.

3. The fluid metering pump of claim 1, further comprising:
a fuel dump shuttle valve in fluid communication with the fuel reservoir, the fuel cylinder, and the discharge conduit, wherein the fuel dump shuttle valve moves between an operating position, which communicates the fuel from the fuel cylinder to the discharge conduit, and a dump position, which communicates the fuel from the fuel cylinder to the fuel reservoir.

4. The fluid metering pump of claim 3, further comprising:
a lever operatively connected to the fuel dump shuttle for moving the fuel dump shuttle between the operating position and the dump position.

5. The fluid metering pump of claim 1, further comprising:
a cap removeably attached to the oil reservoir;
a guide rod extending from the cap into the oil reservoir;
a piston slidably attached to the guide rod;
a biasing spring operatively attached to the piston plate for biasing the piston against the oil within the oil reservoir.

6. The fluid metering pump of claim 1, further comprising an integrated container for storing the fuel to be used as the fuel reservoir.

7. The fluid metering pump of claim 1, further comprising a static mixer positioned within the discharge conduit for mixing the fuel with the oil to form the fuel-oil mixture.

8. The fluid metering pump of claim 1 wherein an amount of the fuel-oil mixture in the batch is selected by selecting a length of stroke of the fuel piston.

9. The fluid metering pump of claim 1, wherein the ratio adjustment device component comprises:
guide rods attached to a housing of the fluid metering pump;
a variable length rod pivotally connected between the fuel piston and the housing;
a rack slidably attached to the guide rods; and
a pin operatively connected between the rack and the variable length rod so that an operator can set the fuel-to-oil ratio.

10. A fluid metering pump, comprising:
a first cylinder;
a first piston reciprocally movable within the first cylinder for drawing a first fluid from a first fluid source and discharging the fluid through a discharge conduit;
a second cylinder;
a second piston reciprocally movable within the second cylinder for drawing a second fluid from a second fluid source and discharging the second fluid through the discharge conduit, wherein the second fluid mixes with the first fluid within the discharge conduit to form a batch of fluid mixture with a predetermined fluid ratio;
a shuttle valve in fluid communication with the first fluid source, the first cylinder, and the discharge conduit, wherein the first shuttle valve moves between an intake position, which communicates the first fluid from the first reservoir to the first cylinder, and a discharge position, which communicates the first fluid from the first cylinder to the discharge conduit;
a biasing spring operatively connected to the first shuttle valve for biasing the first shuttle valve to the intake position; and
a ratio adjustment device operatively connected between the first piston and the second piston, wherein the ratio adjustment device is capable of selecting the fluid ratio of each batch of the fluid mixture.

11. The fluid metering pump of claim 10, further comprising:
a first dump shuttle valve in fluid communication with the first fluid source, the first cylinder, and the discharge conduit, wherein the first dump shuttle valve moves between an operating position, which communicates the first fluid from the first cylinder to the discharge conduit, and a dump position, which communicates the first fluid from the first cylinder to the first fluid source.

12. The fluid metering pump of claim 10, further comprising:
a second shuttle valve in fluid communication with the second fluid source, the second cylinder, and the discharge conduit, wherein the second shuttle valve moves between an intake position, which communicates the second fluid from the second fluid source to the second cylinder, and a discharge position, which communicates the second fluid from the second cylinder to the discharge conduit.

13. A fluid metering pump, comprising:
a fuel cylinder;
a fuel piston reciprocally movable within the fuel cylinder for drawing fuel from a fuel source and discharging the fuel through a discharge conduit;
an oil cylinder;
an oil piston reciprocally movable within the oil cylinder for drawing oil from an oil reservoir and discharging the oil through a discharge conduit, wherein the oil mixes with the fuel within the discharge conduit to form a batch of fuel-oil mixture with a predetermined fuel-to-oil ratio;
an oil shuttle valve in fluid communication with the oil reservoir, the oil cylinder, and the discharge conduit, wherein the oil shuttle valve moves between an intake position, which communicates the oil from the oil reservoir to the oil cylinder, and a discharge position, which communicates the oil from the oil cylinder to the discharge conduit;
a biasing spring operatively connected to the oil shuttle valve for biasing the oil shuttle valve to the intake position; and
a means for selecting the fuel-to-oil ratio of each batch of the fuel-oil mixture operatively connected between the fuel piston and the oil piston.

14. The fluid metering pump of claim 13, wherein the means for selecting the fuel-to-oil ratio, comprises:
guide rods attached to a housing of the fluid metering pump;
a variable length rod pivotally connected between the fuel piston and the housing;
a rack slidably attached to the guide rods; and
a pin operatively connected between the rack and the variable length rod so that an operator can set the fuel-to-oil ratio.

15. The fluid metering pump of claim 13, further comprising:
a fuel dump shuttle valve in fluid communication with the fuel reservoir, the fuel cylinder, and the discharge conduit, wherein the fuel dump shuttle valve moves between an operating position, which communicates fuel from the fuel cylinder to the discharge conduit, and a dump position, which communicates fuel from the fuel cylinder to the fuel reservoir.

16. The fluid metering pump of claim 13, further comprising:
an oil shuffle valve in fluid communication with the oil reservoir, the oil cylinder, and the discharge conduit, wherein the oil shuffle valve moves between an intake position, which communicates oil from the oil reservoir to the oil cylinder, and a discharge position, which communicates the oil from the oil cylinder to the discharge conduit.

17. A method of metering fluids with a fluid metering device having a fuel cylinder, a fuel piston reciprocally movable within the fuel cylinder, an oil cylinder, an oil piston reciprocally movable within the oil cylinder, and a ratio adjustment device operatively connected between the fuel piston and the oil piston, wherein the ratio adjustment device is capable of setting a fuel-to-oil ratio of each batch of fuel-oil mixture, the method comprising the steps of:

provide an oil reservoir;

filling an oil reservoir with oil;

providing a fuel reservoir;

filling a fuel reservoir with fuel;

selecting a fuel-oil ratio on the ratio adjustment device;

providing an oil shuttle valve in fluid communication with the oil reservoir, the oil cylinder, and the discharge conduit;

moving the oil shuttle valve to an intake position, to provide fluid communication between the oil reservoir and the oil cylinder;

raising the fuel piston with an intake stroke so that the fuel is drawn from the fuel reservoir to the fuel cylinder and the oil is drawn from the oil reservoir to the oil cylinder;

moving the oil shuttle valve to a discharge position to provide fluid communication between the oil cylinder and the discharge conduit; and lowering the fuel piston with a discharge stroke so that the fuel and the oil mix within the discharge conduit into a fuel/oil mixture with a selected fuel-to-oil ratio and discharge through a spout.

18. The method of metering fluid of 17, further comprising the step of:

moving a dump shuttle valve between an operating position, which communicates the fuel from the fuel cylinder to the discharge conduit, and a dump position, which communicates the fuel from the fuel cylinder to the fuel reservoir.

19. The method of metering fluid of 17, wherein the ratio adjustment device comprises:

guide rods attached to a housing of the fluid metering device;

a variable length rod pivotally connected between the fuel piston and the housing;

a rack slidably attached to the guide rods; and a pin operatively connected between the rack and the variable length rod so that an operator can set the fuel-to-oil ratio.

* * * * *

UNITED STATES PATENT AND TRADEMARK OFFICE
CERTIFICATE OF CORRECTION

PATENT NO. : 7,562,792 B2  
APPLICATION NO. : 11/151361  
DATED : July 21, 2009  
INVENTOR(S) : George Nisbet Page 1 of 1

It is certified that error appears in the above-identified patent and that said Letters Patent is hereby corrected as shown below:

Col. 8, Line 64
   Replace "shuffle"
   with --shuttle--

Col. 8, Line 66
   Replace "shuffle"
   with --shuttle--

Signed and Sealed this

Twenty-second Day of September, 2009

David J. Kappos
*Director of the United States Patent and Trademark Office*